(12) United States Patent
Garvey et al.

(10) Patent No.: US 7,979,513 B2
(45) Date of Patent: Jul. 12, 2011

(54) METHOD AND SYSTEM FOR DETERMINING A MANAGEMENT COMPLEXITY FACTOR FOR DELIVERING SERVICES IN AN ENVIRONMENT

(75) Inventors: Sean P. Garvey, Manassas, VA (US); Stephen T. O'Keefe, Manassas, VA (US); William S. Edgar, Oakton, VA (US); John G. Birch, Nokesville, VA (US); Akilesh V. Duvvur, Apharetta, GA (US); Gary R. Hix, Warrenton, VA (US); Philip T. Spencley, Alexandria, VA (US); Gerald T. Winner, Boothwyn, PA (US); Matthew G. Sharib, Howell, NJ (US); John F. Echaniz, Front Royal, VA (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 11/730,215

(22) Filed: Mar. 30, 2007

(65) Prior Publication Data
US 2007/0234301 A1 Oct. 4, 2007

Related U.S. Application Data

(60) Provisional application No. 60/787,664, filed on Mar. 31, 2006.

(51) Int. Cl.
*G06F 15/177* (2006.01)
(52) U.S. Cl. ............. 709/220; 709/224; 709/226; 703/2
(58) Field of Classification Search .................. 709/220, 709/224, 226; 703/2
See application file for complete search history.

(56) References Cited

U.S. PATENT DOCUMENTS

| | | | |
|---|---|---|---|
| 5,598,532 A * | 1/1997 | Liron | 703/2 |
| 6,086,618 A * | 7/2000 | Al-Hilali et al. | 703/2 |
| 6,311,144 B1 * | 10/2001 | Abu El Ata | 703/2 |
| 6,578,004 B1 | 6/2003 | Cimral et al. | |
| 6,684,192 B2 | 1/2004 | Honarvar et al. | |
| 6,757,689 B2 | 6/2004 | Battas et al. | |
| 6,763,326 B1 * | 7/2004 | Watkins et al. | 703/21 |
| 6,859,781 B1 | 2/2005 | Gloor et al. | |
| 6,876,993 B2 | 4/2005 | LaButte et al. | |
| 6,954,757 B2 | 10/2005 | Zargham et al. | |
| 6,990,437 B1 * | 1/2006 | Abu El Ata | 703/2 |
| 6,996,517 B1 * | 2/2006 | Papaefstathiou | 703/22 |
| 7,162,427 B1 * | 1/2007 | Myrick et al. | 705/1 |
| 7,487,237 B2 * | 2/2009 | Lloyd et al. | 709/224 |
| 7,490,023 B2 * | 2/2009 | Aniszozyk et al. | 702/182 |
| 7,568,019 B1 * | 7/2009 | Bhargava et al. | 709/223 |
| 7,630,877 B2 * | 12/2009 | Brown et al. | 703/21 |
| 2007/0168914 A1 * | 7/2007 | Reddy | 717/101 |

* cited by examiner

*Primary Examiner* — Dohm Chankong
*Assistant Examiner* — Thomas J Dailey
(74) *Attorney, Agent, or Firm* — John R. Pivnichny; Law Office of Jim Boice

(57) ABSTRACT

Method and system for determining a management complexity factor for an environment, such as an information technology (IT) environment, is disclosed. A management complexity factor represents the needless complexity, inefficiencies and waste in an environment. An IT environment includes different platforms, systems, and components that have an effect on changes and upgrades within the environment. The impact of the changes or upgrades is reduced if the environment has increased coordination, few single points of failure, high information availability, a high level of automation and the like. The management complexity factor is determined by evaluating several metrics according to objective criteria and weighing the metrics according to their importance. Using the management complexity factor, strategies and targets are identified to lower the complexity and inefficiencies within the environment.

10 Claims, 5 Drawing Sheets

METHOD AND SYSTEM FOR DETERMINING A MANAGEMENT COMPLEXITY FACTOR FOR DELIVERING SERVICES IN AN ENVIRONMENT

CROSS REFERENCE TO RELATED APPLICATION

This application claims the benefit under 35 U.S.C. §119(e) of U.S. Provisional Application No. 60/787,664 filed Mar. 31, 2006.

TECHNICAL FIELD OF THE INVENTION

The present invention relates to determining a management complexity factor that signifies the complexity in delivering a set of services. More particularly, the present invention relates to determining a management complexity factor for an information technology environment to facilitate the reduction of needless complexity and wasted resources within the environment.

DESCRIPTION OF THE RELATED ART

An information technology (IT) environment allows information to be distributed across organizations, departments and groups to consumers or users. Computers are set up in a network to share information and to access resources in the network. Large amounts of data and information are available to users in the network without having dedicated resources in each location. The access to the information appears seamless and quick despite the network possibly having many users and devices connected to it.

One problem that may arise within such an environment is that large amounts of information might reside or be located on disparate systems and platforms. The integration of the different systems and platforms for better performance may be difficult. Further, organizations may adopt that latest technologies or solutions when addressing their IT upgrades, and thereby need to integrate their legacy applications and computers with the new solutions. In other words, changes on an aspect of the network impact the IT environment in unforeseen ways. Modifications and changes also create challenges depending on the different systems and platforms to make sure the improvements are compatible with the legacy network.

Solutions, however, to IT issues may waste resources by requiring additional software, manpower and other resources to integrate new applications. Further, modifications and upgrades should seek to reduce inefficiencies in an environment and not increase complexity. The resources needed to implement modifications and upgrades may depend on the complexity of the IT environment.

One measure of complexity of an environment is the amount of data storage it requires. If an environment is determined to be complex, then large amounts of data storage may be allocated. This assessment, however, may not be accurate because a large storage space requirement is not always the best indicator of complexity.

Further, organizations, departments and enterprises continuously struggle to determine the optimal mix of process, technology and manpower needed to provide a defined set of services to customers and users, especially in an IT environment. These groups may attempt to model these aspects to improve service and capability. For example, internal staffing levels may be compared to published industry staffing averages to determine if needs are being met. This comparison may be erroneous due to any differences between the current project and the published staffing average No organization is "average" and the services delivered may vary greatly within the organization or within the industry. Certain crucial components of an environment may not even be considered at all using these methods. Thus, organizations seeking to improve their IT environment are stuck basing their assessments on major factors that may not be relevant, or on erroneous modeling.

While modifications, upgrades and changes to an existing IT environment will continue on networks, those considerations and factors most critical to reducing complexity in the environment may be ignored. Legacy systems, different platforms and applications result in a complexity that makes the changes difficult and costly. Proper identification of actions that reduce the complexity of an existing environment may result in a decrease in costs and resources of managing the environment.

SUMMARY OF THE INVENTION

Use of the present invention is aimed at services providing storage and backup to networks. The present invention may be used for storage array technologies as well as information technology services that provide support for servers and terminals within the network. The present invention may be used in conjunction with the primary architecture for solutions of disaster recovery. The complexity factor allows one to get a snapshot of the configuration and capabilities of the network, and also provides a map for improving the efficiency of the network. The increased efficiency optimizes the delivery of the services within the network.

The complexity factor is a clear measure of the complexity of the network. For example, a network may be so complex that no one person or group understands the workings of the entire network. No one is able to identify and fix a problem within the network without involving considerable time, expense and manpower. Repairs and upgrades are performed in an ad-hoc manner and no coordination or cooperation is found. Further, a potential complexity factor is calculated that corresponds to the idealized environment given the constraints and design limitations of the environment. The potential complexity factor is compared to the current complexity factor to show how much improvement can be made in the environment.

The present invention supports the comparison for improvement and optimization by collecting information in an easily understood manner and by reviewing aspects of the environment that are common to all networks. The present invention uses criteria that are objectively defined to evaluate the environment. These criteria are used to calculate the complexity factor. The criteria further are emphasized or de-emphasized using tiers, or groupings, of critical factors apart from non-critical ones. The values are contrasted from potential values, which reflect the best level the environment can be for the criteria. Using the differences between the current and potential values, managers of networks are able to make informed decisions how to best improve efficiency and delivery of services. The improvements lead to a reduction in manpower or an increase in capability within the network.

Accordingly, the disclosed embodiments are directed to determining a management complexity factor (MCF) to signify the complexity in delivering a set of defined services within an environment, such as in an IT environment. A high complexity factor may indicate needless or wasteful complexity in conjunction with a low level of efficiency within the environment. The high complexity factor is compared to a potential complexity factor to determine how close the environment is to operating at an optimal level. The present invention then may initiate actions to be taken according to the management complexity factor that lower the complexity of the environment and reach the potential complexity factor. A lower complexity factor results in reduced costs, better use of manpower and resources, and a better overall IT environment.

For example, the present invention may determine a complexity factor for an IT environment by determining a value of a metric of a variety of metrics. The metric corresponds to a component of the IT environment. Thus, multiple components may result in multiple metrics being considered. Preferably, the complexity factor is based upon 8 metrics that encompass all the data points needed to model the complexity of the IT environment. Unlike the related art, the present invention considers more than just large storage space in determining the complexity of an environment.

The value of the metric is determined objectively according to the defined criteria. Thus, the value, or values, are not just given, but are based on criteria that are defined for the specific component. The metric is also assigned to a tier of a variety of tiers, where each tier corresponds with a tier weight. Some tiers may be considered more important than others by using the tier weights. Thus, the present invention may model an environment in a more accurate manner as opposed to just guessing or comparing the various components within the environment.

Preferably, three tiers are used for determining the complexity factor. Thus, all the components may be within one of the three tiers. The complexity factor is calculated for the environment using the values of the metrics and the tier weights for the different tiers. The complexity factor then may be lowered using different values as actions are taken to improve the environment. The complexity factor determined above is compared to a potential complexity factor. The comparison provides an indication of how efficient and optimized the environment is.

Certain components may be targeted to lower the overall complexity of the environment, which results in saving resources and costs. Further, the dedication of resources and efforts to minimally lower the complexity may be avoided. Because the present invention grades each component individually but subjects the value to a tier weight, those components that provide the biggest return on reducing complexity of the environment may be identified.

According to the present invention, a method for determining a complexity for an environment is disclosed. The method includes determining a value of a metric of a plurality of metrics. The metric corresponds to a component of the environment. The method also includes assigning the metric to a plurality of tiers. Each tier of the plurality of tiers corresponds to a tier weight. The method also includes calculating a management complexity factor for the environment using the values of the plurality of metrics and the tier weights for the plurality of tiers.

According to the present invention, another method for determining a complexity factor of an environment also is disclosed. The method includes determining a first category number for a first metric relating to the environment. The method also includes assigning a value for the first metric according to the first category number. The method also includes determining a second category number for a second metric relating to the environment. The method also includes assigning a value for the second metric according to the second category number. The method also includes applying a tier weight to at least one of the first value and the second value. The method also includes determining a management complexity factor based on the first value and the second value.

According to the present invention, a network environment also is disclosed. The network environment includes a plurality of components having an attribute. The network environment also includes a tool to analyze the plurality of components according to the attribute to determine a metric. The metric correlates to a value. The network environment also includes a calculator to determine a management complexity factor using the value.

Additional features and advantages of the disclosed embodiments will be set forth in the description that follows, and in part will be apparent from the description, or may be learned by practice of the invention. The objectives and other advantages of the disclosed embodiments may be realized and attained by the structure and functionality particularly pointed out in the written description and claims as well as the drawings.

BRIEF DESCRIPTION OF THE DRAWINGS

The drawings, which are included to provide further understanding of the invention, are incorporated in and constitute a part of the specification. The drawings illustrate embodiments of the present invention, and together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. It is to be understood that the foregoing discussion and the following detailed description are exemplary and explanatory, and are intended to provide further explanation of the invention as claimed.

As discussed above, the present invention relates to the determination of a management complexity factor (MCF) that provides an indication of the overall complexity of the IT environment by taking into account metrics relating to components of the environment. The components are defined within the environment and are assigned metrics in an objective manner so that potential improvements or enhancements may be identified. Further, the present invention provides a manner to emphasize the more important aspects of the environment because not every environment is the same. Thus, weak comparisons to legacy environments or other projects are avoided.

The metrics are data points that encompass all of the data points to capture the level of effort needed within an organization in delivering a set of services. Use of metrics to determine the management complexity factor allows for simplified determination of prime areas for optimization within the environment. Thus, instead of looking at the same factors as usual, real improvement is realized by making those changes that truly reduce complexity. As a result, resources may be saved and not wasted.

Figure 1:
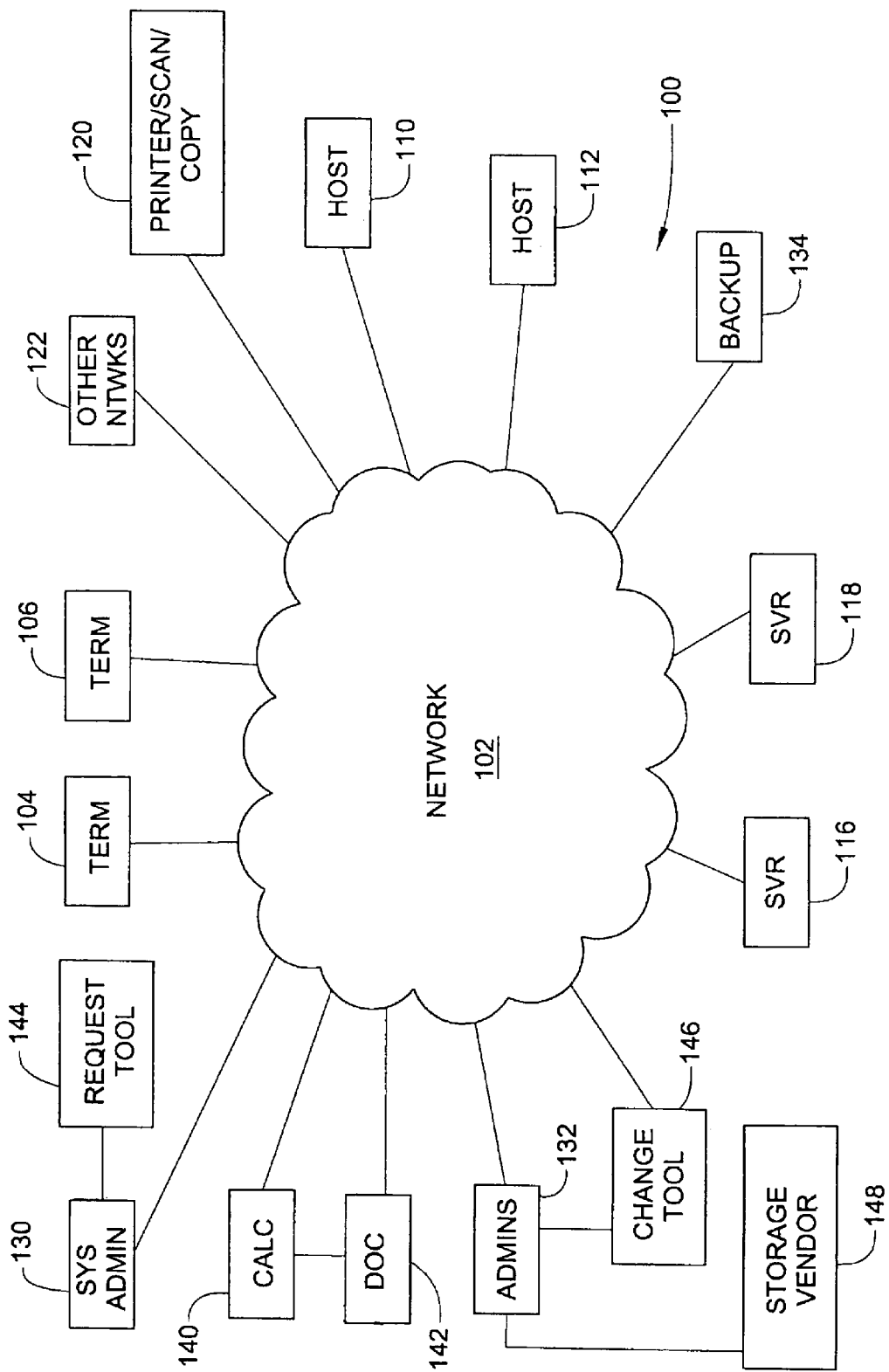
FIG. 1 illustrates an information technology environment according to the disclosed embodiments.

FIG. 1 depicts an IT environment 100 according to the disclosed embodiments. IT environment 100 includes a variety of components, platforms, systems, applications and the like. The number of components shown in FIG. 1 is for illustrative purposes only, and IT environment 100 may include many different other components, platforms, devices, systems, and the like. Each component includes attributes that define the functionality of the component or an aspect about the component. An attribute may be common to two or more components. Alternatively, an attribute may be unique to the component. Examples of attributes include operating system, software requirements, specific or generic applications, maintenance requirements, planned upgrades, automation of routine or labor intensive jobs, availability of tools, maturity of the components, points of failure, interconnectivity and the like.

Network 102 connects all the different components, platforms, devices and systems to each other. Network 102 may include any type of network used to exchange information and data from one point to another. For example, network 102 may be a storage network, a wide-area network (WAN), local-area network (LAN), ethernet, virtual network, wireless, wired or both, satellite-based, optical, and the like. Network 102 includes the hardware and software to support functions, communications and data exchange.

IT environment 100 also includes terminals 104 and 106. Terminals 104 and 106 may represent computer terminals or workstations connected to network 102. Terminals 104 and 106 may store files, data, programs, applications and other information used at the terminals or accessible by others over network 102. Terminals 104 and 106 also may be used by users or customers to access network 102 or IT environment 100.

IT environment 100 also includes hosts 110 and 112 and servers 116 and 118. These components of IT environment 100 also may act as platforms, workstations and the like, and may include files, data, programs, applications and the like. Hosts 110 and 112 may include specific applications to perform different tasks using information from within network 102. Servers 116 and 118 may store and provide access to large amounts of data or information so as to reduce the burden on terminals 104 and 106, and other components connected to network 102. Servers 116 and 118 also may include arrays for storing large amounts of data.

FIG. 1 shows these different components of IT environment 100 to emphasize that the components are different from each other. A variety of different terminals, hosts and servers may be connected to network 102 that are considered for any modifications or changes to IT environment 100. Further, terminals 104 and 106, hosts 110 and 112, and servers 116 and 188 may execute different software or, for example, use different operating systems.

The architecture and configuration of the terminals, hosts, servers and the like of IT environment 100 may differ. For example, server 116 may configure its arrays different than server 118. Host 110 may include a different processor than host 112. Any examination of IT environment 100 should include taking into account the various differences, as well as similarities, between the different components and their attributes connected to network 102.

IT environment 100 also may include printer/scanner/copier device(s) 120. Though depicted with one block, many different types of these devices may be connected to network 102. Devices 120 help with the reproduction or copying of data and information within IT environment 100. Devices 120 also may be used to enter data onto network 102. Devices 120 also may include their own platforms, software, operating systems, applications and the like. Further, devices 120 may require expertise or supplies that are unique to each device.

All these different components, platforms, and the like contribute to the complexity of IT environment 100. IT environment 100 would be more manageable if the components had common features, architectures, configurations and the like, but the reality is that different components are replaced or upgraded at different times. Tasks are not necessarily performed in a streamlined manner. The present invention may avoid that problem by taking into account these differences as well as other aspects of IT environment 100.

IT environment 100 also includes various manpower positions and tools to facilitate change. Although some of these components may be spoken of in the singular form, they also may include a plurality of people or tools to perform the functions disclosed below. System administrator 130 may have particular hosts, servers or devices to manage within IT environment 100. System administrator 130 may be responsible for the different components and their availability. System administrator 130 may approve or initiate upgrades or changes to these components, and may be responsible for assessing any impact on IT environment 100. System administrator 130 also should follow any applicable standards regarding IT environment 100.

System administrator 130 may use request tool 144 to initiate changes to an aspect of IT environment 100. System administrator 130 sends a request to request tool 144. Preferably, the request is a formal request that initiates the change process. Request tool 144 may store the request for processing or further review. Request tool 144 forwards the request to change request tool 146. Administrators 132 have access to change request tool 146, and the request initiated by system administrator 130.

Administrators 132 also may be referred to as managers, stakeholders, personnel and the like. Administrators 132 may manage the storage needs of IT environment 100. The present invention is not limited to people specifically named administrators for this feature. Administrators 132 also may perform various functions within IT environment 100. For example, administrators 132 may manage specific projects, share documentation, create uniform standards, follow formal standards, communicate to teams formally and informally, evaluate requests, implement changes and upgrades and the like. Administrators 132 may differ from conventional administrators that do not share documentation and create their own formal or informal standards. IT environment 100 may rely upon administrators 132 to oversee network 102 and its attached components. Different administrators may be assigned to different components. For example, a group of administrators 132 may perform the above-disclosed functions for servers 116 and 118.

IT environment 100 also includes storage vendor 148. Storage vendor 148 may be in direct contact with administrators 132 to exchange requests and authorizations regarding storage within IT environment 100. Storage vendor 148 also performs provisioning requests. Storage vendor 148 is not limited to one person or group, and its functions may be carried out by various personnel or groups.

IT environment 100 also includes backup system 134. Backup system 134 also may include an administrator. Backup system 134 performs backup services and functions for IT environment 100. Backup system 134 may not necessarily backup all components of IT environment 100, but only those identified by the administrator. Backup system 134 also may have particular hosts to manage to perform its functions. The hosts may differ from the other components of IT environment 100. Backup system 134 also may follow storage administrative standards, preferably from storage vendor 148.

Other networks 122 relate to outside networks that communicate with network 102 or IT environment 100. Preferably, IT environment 100 will not be concerned with other networks 122. Other networks 122 may follow their own protocols or standards, have their own administrators, backup system, tools and the like. An example of this relationship may be receiving email from a third party service provider. Alternatively, IT environment 100 and network 102 may not connect with other networks, and are stand alone.

Thus, IT environment 100 includes many different components, platforms and the like. The different components may be upgraded, modified or replaced at any time. For example, terminals 104 and 106 may be replaced by newer models of computers. The replacements may add to the complexity of IT environment 100 because the new computers come with a new operating system, may be wireless capable, and the like.

The determination of complexity for IT environment 100 may be performed by MCF tool 141 and calculator 140. MCF tool 141 is used to analyze and determine metrics of different aspects of IT environment 100. MCF tool 141 may includes an interface to prompt a user to collect information about environment 100, network 102, any of the components and their attributes and the like. The user also may utilize MCF tool 141 to review the information. After the analysis, MCF tool 141 allows the user to select a metric based on defined, objective criteria.

Using an algorithm based on the objective criteria, calculator 140 weighs various metrics assigned for IT environment to generate the management complexity factor. A document 142 may be generated that includes the management complexity factor. Calculator 140 may be tasked to produce document 142 with a management complexity factor by system administrator 130, tools 144 and 146 or administrators 132. Other components of IT environment 100 also may task calculator 132 to evaluate the complexity.

Calculator 140 and MCF tool 141 are part of the assessment methodology used by IT environment 100. Calculator 140 seeks to determine a management complexity factor used to reduce the number of tools, and to prevent duplication of tools and systems within IT environment 100. Calculator 140 also may be part of backup system 134, even though it is shown separately in FIG. 1. Calculator 140 assesses IT environment 100 and then determines a score, or the management complexity factor, that is presented in deliverable document 142. Calculator 140 also can be used to determine a potential complexity factor.

Various metrics may be considered when assessing complexity. Within each metric, a value may be given based on well-defined, objective criteria. The values are weighted depending on their impact on overall complexity. The resulting values are then added or otherwise brought together to generate the management complexity factor. Alternatively, the assigned values may correspond to a weight value for that metric. A high management complexity factor may indicate high and needless complexity within IT environment 100, which requires more resources, manpower or technology to deliver the desired services.

As disclosed above, environment 100 has a complexity factor for its current state. The complexity factor could be high or low, depending on the aspects of environment 100 that prohibit the delivery of services. The complexity factor is calculated using objective criteria. The current complexity factor is compared to a potential complexity factor that represents the optimal environment that delivers services in a more efficient and streamlined manner.

Figure 2:
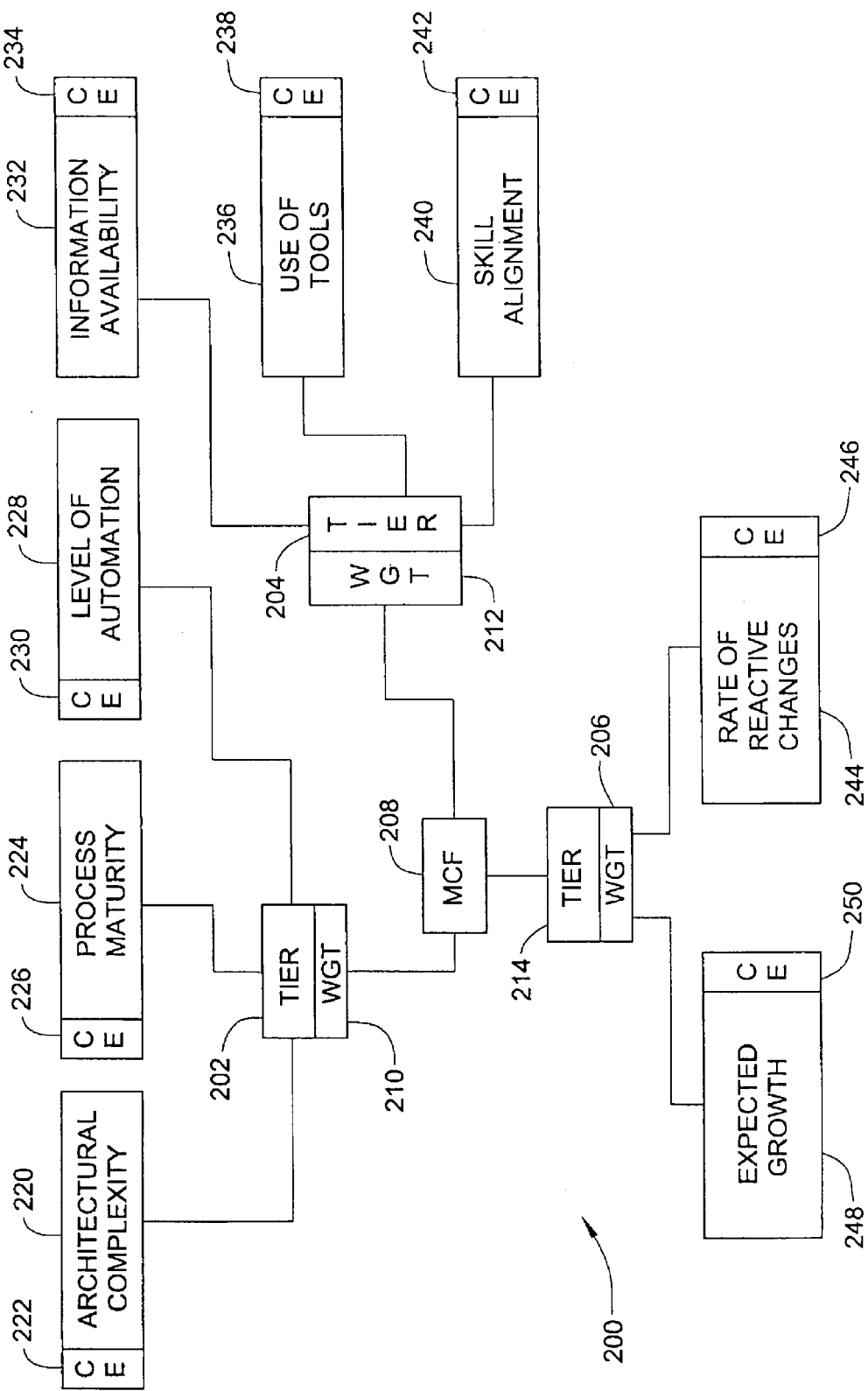
FIG. 2 illustrates an environment of metrics and tiers represented by a management complexity factor according to the disclosed embodiments.

FIG. 2 depicts an environment 200 of metrics and tiers represented by a management complexity factor according to the disclosed embodiments. Though the components of IT environment 200 are not shown, they may resemble those disclosed with reference to FIG. 1. Instead, FIG. 2 shows metrics that represent aspects of IT environment 200. The metrics may serve to model components, features or aspects of IT environment 200.

The metrics are assigned values based on underlying value definitions per industry. The values may correspond to a category efficiency (CE) number. The CE number defines, for that category, the current level of efficiency in IT environment 200 according to an industry best practice. A higher CE number correlates to needless complexity and bad practices.

The metrics also may be broken into tiers based on their effect on the overall delivery of the defined services. For example, tier 202 may be referred to as "tier one" as it includes the metrics having the most effect on the overall delivery of services. Tier 204 may be referred to as "tier two" because it includes metrics having a lower effect on the delivery of services. Tier 206 may be referred to as "tier three" because it includes metrics having the least effect on the delivery of services. Thus an organization desiring to improve its efficiency model may focus on the metrics associated with tier 202 to have the most impact.

The importance of tiers 202, 204 and 206 may be emphasized by having weights, or percentages, related to MCF 208. For example, tier 202 may have weight 210, tier 204 may have weight 212 and tier 206 may have weight 214. By changing the percentages of weights 210, 212 and 214, the effects of the values of the metrics of tiers 202, 204 and 206 may be emphasized or de-emphasized. According to the example, IT environment 200 may desire the values associated with the metrics of tier 202 to comprise 60% of MCF 208. Thus, weight 210 may be set to 60%. Tier 204, having a lower effect on MCF 208, may have weight 212 set to 30%, while tier 206 may have weight 214 set to 10%.

FIG. 2 shows IT environment 200 with 8 metrics. Each metric relates to a defined category that impacts the value of MCF 208. The present invention is not limited to 8 metrics, but may include as many as desired. Each metric also includes a CE number that is assigned to the metric using objective criteria and analysis. Metrics within IT environment 200 are disclosed below along with applicable definitions for the CE numbers associated with each metric.

Metric 220 may be referred to as architectural, or infrastructure, complexity. Architectural complexity may relate to the various components of the infrastructure, such as those shown in FIG. 1, and how the components are implemented and integrated in accordance with the best practices of the industry. Components within an infrastructure may be configured and interconnected according to the best practices with major single point of failure (SPOF) issues. SPOFs may be defined as those failures that can severely impact the infrastructure. For example, a SPOF in one component may adversely effect greater than 35% of IT environment 200, thereby causing major disruptions to users and other components. Service delivery may be severely impacted as well.

For example, an industry best practice is using dual path connections between components to provide redundancy. Using dual paths, the components always have a communication path available in the event of the failure of one path. A practice that having complex architecture would have only a single path connection between components, which would lead to single points of failure as the connection would have to be repaired before communication is re-established. Industry best practices are based on expert or academic literature, vendors, the product itself, design considerations, generally held principles, support considerations and the like. For example, single points of failure are avoided in best practices. Designs and planning of a network is a best practice that avoids SPOFs and other complexity pitfalls.

Metric 220 may be classified into 5 different categories to determine CE number 222. CE number 222 may receive a value of 1 if the components of are configured and interconnected according to best industry practices with no SPOFs. Thus, issues or errors in one part do not impact the delivery of services in another part or bring an end to the user experience. The architectural complexity is at its "least complex" level.

CE number 222 may receive a value of 2 if the components generally are configured and interconnected according to best practices with no SPOFs. Thus, issues or errors in one component causes performance degradation, but no outages to end the user experience. An SPOF will be noticed in the delivery of services within the environment, though a need for reboot or system down time is avoided.

CE number 222 may receive a value of 3 if the components generally are configured and interconnected according to best practices with minor SPOFs. Issues or errors in one component adversely impacts less than 10% if the environment. Minor disruptions may be experienced by the end user and in the delivery of services within the environment.

CE number 222 may receive a value of 4 if the components generally are configured and interconnected according to best practices, but with major SPOFs. The environment is more complex than those applicable to the previous CE number values. Issues or errors in one component adversely impacts less than 35% of the environment. Major disruptions are experienced by the end user due to the higher architectural complexity, and the delivery of services may be compromised by the SPOFs.

CE number 222 may receive a value of 5 if the components generally are configured and interconnected according to best practices with multiple SPOFs. Due to the high complexity, issues or errors in one component adversely impacts greater than 35% of the environment thereby causing complete disruption to the end user. The architectural complexity is at its "highest" level. A failure could result in the shutdown on the entire network.

One skilled in the art may appreciate that lowering the architectural complexity of an environment would impact overall management complexity factor in a positive manner. Thus, metric 220 is associated with tier 202. Further, improvement of the efficiency of IT environment 200 may result from lowering CE number 222 in this category.

Metric 224 may be referred to as process maturity. Process maturity may relate to how defined, appropriate and mature the processes and procedures are to the delivery of the services. An evaluation of process maturity asks how mature are the processes and is there any repetitive effort in using the processes within the environment. For example, using the same process at different locations with no coordination between the locations may be ill advised. Process maturity also evaluates the proper coordination between processes, the use of the processes, and is the processes defined. In an optimal environment, regular review and testing of the processes used within the environment is performed for improvement and maturity.

Processes and procedures in an inefficient environment are ad-hoc, or through individual's efforts and methods. Thus, metric 224 is based on how well the processes and procedures are developed and implemented within IT environment 200. An example of optimal process maturity is the use of fully operational documentation that is reviewed regularly for updates. The documentation is at a level where new personnel can review the documentation quickly to come up to speed on the processes in the environment. An ad-hoc environment would treat processes as just adding more space and resources to any problems. Processes are untrackable and unaccountable. Thus, the environment becomes unmanageable. Untracked verbal work requests are indicators of an ad-hoc environment.

Metric 224 may be classified into 5 different categories to determine CE number 226. CE number 226 may receive a value of 1 if continuous process and procedure improvement occurs by quantitative measurement of the process or procedure. Complexity and inefficiencies may be minimized by continuing the testing or implementation of innovative ideas and technologies. Processes and procedures may be followed at this level.

CE number 226 may receive a value of 2 if metrics are defined around processes and procedures to determine effectiveness. Performance of the procedures can be quantitatively measured. CE number 226 may receive a value of 3 if all processes and procedures are documented and standardized. All efforts are made to follow published guidelines at this level. Improvement of processes and procedures may not be as defined at the lower values, or may not be implemented in a timely manner.

CE number 226 may receive a value of 4 if basic processes and procedures are established but sporadically followed. For example, enforcement of the guidelines may be lax or unfeasible. Improvement to a process or procedure may go unnoticed or ignored. CE number 226 also may receive a value of 5 if processes and procedures are ad-hoc. Individual efforts and methods are used to manage IT environment 200. Little to no coordination may be involved in implementing processes and procedures. This value may represent the most inefficient category of process maturity.

Improvements in process maturity to achieve the features disclosed by having a value of 1 may be desirable so that processes and procedures are continuously improved and measured. Continuous measurement may be desirable to be able to detect any change and degradation within IT environment 200. Further, ease of implementation impacts complexity because more efficient environments may be able to do so seamlessly. Environments having ad-hoc or a multitude of different processes and procedures may result in a higher MCF 208, and should be avoided.

Metric 228 may be referred to as the level of automation within IT environment 200. The level of automation relates to the number of tedious or time consuming tasks that are automated to free manpower. Thus, personnel may focus on more proactive duties and more productive tasks. A low level of automation means personnel wastes time on repetitive and lower skilled tasks. The greater number of frequently repetitive and labor intensive tasks that are automated results in a lower value for metric 228.

Tasks that should be automated include those tasks that are done manually and on a repetitive basis. For example, a process is performed everyday, like automatically logging onto a server to download emails or work requests. A user could sit and type in the instructions, or a program could automatically do this function. Another example is operating system patches that an operating system regularly needs. The environment can check the vendor's website on a regular basis, such as once a week, for the patches.

Another example might be backing up information and data in the event of a system crash or other disaster. If done manually, these processes can be time consuming. The automation of the process allows manpower to be freed up and time consuming tasks avoided. To evaluate this metric, the processes that are routinely performed on a regular basis are reviewed to see which ones are eligible for automation. The eligible number is compared to the actual number. If the difference is large, then the value for this metric is high.

Metric 228 may be classified into 5 different categories to determine CE number 230. CE number 230 may receive a value of 1 if all repeated and labor intensive tasks within IT environment 200 are automated. The tasks may be defined that potentially can be made automated. If these tasks are already automated, then the complexity of IT environment may be low. If a number of the repeated and labor intensive tasks are to be automated, then a CE number value defined below may be more appropriate.

CE number 230 may receive a value of 2 if most of the repeated and labor intensive tasks are automated. For example, CE number 230 may be 2 if 66% of the defined tasks are automated. In another embodiment, a limit of 50% may be set to reach a value of 2. Therefore, the lowest limit to achieve a definition of "most" tasks for IT environment 200 may be varied.

CE number 230 may receive a value of 3 if all major frequently repeated and labor intensive tasks are automated. Major tasks may be defined according to criteria set within IT environment 200. The criteria may be related to manpower or equipment needs, or the amount of people impacted by the tasks. For example, the ordering of office supplies may be considered a major task. Even though few people may be involved with the ordering, the process could impact everyone within an organization. Thus, according to this example, ordering supplies may be considered a major task.

CE number 230 may receive a value of 4 if few frequently repeated and labor intensive tasks are automated. As disclosed above, the level desired to define "few" may be varied within IT environment 200. For example, if less than 33% of the defined tasks are automated, then CE number 230 may be given a value of 4. Alternatively, if less then 50% of the defined tasks are automated, then CE number 230 may be given a value of 4.

CE number 230 may receive a value of 5 if no frequently repeated and labor intensive tasks are automated. An environment having this value would be complex as nothing is being done to save time, resources or manpower through automation. Many different processes may co-exist without any plan to consolidate or automate them. Even major tasks are not automated. The present invention, however, may adjust this level from 0 to a low number if desired. For example, if the number of defined tasks is at 10% or lower automation, then CE number 230 may be 5.

Because of their importance, metrics 220, 224 and 228 may be assigned to tier 202. The values of the metrics of tier 202 may be weighted according to weight 210, or, in this instance, the values may be weighted by 60% to give these metrics a greater emphasis in evaluating the complexity of IT environment 200. Reductions of the CE number values in metrics 220, 224 or 228 may result in the biggest reductions for MCF 208. The remaining metrics are assigned to other tiers.

Metric 232 may be referred to as the information availability within IT environment 200. Information availability relates to how effective the implemented tools are in meeting the operational, supervisory and executive management information and reporting needs. The availability of information in a prompt and accurate manner helps reduce complexity within IT environment 200 because users or tools are not spending a lot of time finding the information or determining the veracity of the information. Inaccurate or faulty information and data are just as bad as the lack of information. Further, if the information is not available promptly, then time and resources may be wasted waiting on the information.

A tool is measured by determining how effective the tool is at getting information where it needs to go, and how effective the tool is at getting the right information as opposed to needless information. Use of specialized tools to achieve the above objectives increases the complexity of an environment and increases the amount of storage needed to accommodate the different number of tools. Purchases and upgrades to components within the structure are not made with any consideration to usage or storage requirements in complex environments. An example of good information availability is having up-to-date usage information on tools. The current information provides managers and purchasers accurate knowledge of needs being met.

Metric 232 may be classified into 5 different categories to determine CE number 234. CE number 234 may receive a value of 1 if consolidated tools provide comprehensive environmental data that are automatically correlated to provide uniform, helpful and targeted information or data that gives an understanding of how IT environment 200 is working. For example, the information or data provided may be useable and accessible without a considerable amount of extra processing or research. Further, the information or data regards IT environment 200 as a whole, and is not just applicable to single components or parts.

CE number 234 may receive a value of 2 if multiple tools provide comprehensive environmental data that is manually correlated to provide uniform, helpful and targeted information to give an understanding of how IT environment 200 is functioning. At this level, IT environment 200 may still provide good information, but may have to do further processing before it becomes available. As opposed to the automated correlation of the data, the data is manually correlated. Thus, additional personnel or manpower may be needed to support information availability at this level.

CE number 234 may receive a value of 3 if adequate tools provide insight into the major areas of IT environment 200 that gives a fair understanding of how IT environment 200 is functioning. Thus, correlated information may not be readily available for IT environment 200. Further, not all components or features of IT environment 200 may be monitored, or have information readily available. Time delays and manpower requirements may increase as a result, which further increases the complexity of IT environment 200.

CE number 234 may receive a value of 4 if few tools are used to gather data. Further, IT environment 200 has little ability to interpret the data, or large holes may exist in monitored areas. These shortcomings cause difficulty in understanding how IT environment 200 is functioning. Additional processing and work will have to be done to provide any useful information on availability. Further, the amount of IT environment 200 that is monitored and has information available may not be much as there are not enough tools to use. Although some information may be available at this level, the drawbacks are significant enough to warrant a high level of complexity.

CE number 234 may receive a value of 5 if no tools are used to gather data. Further, little to no understanding is provided as to how IT environment 200 is functioning. With no data or tools to gather information, very little, if any, information may be available regarding IT environment 200. None of the components of IT environment 200 are being monitored.

Thus, no information or data is available to make decisions impacting the overall condition of IT environment 200.

Metric 236 may be referred to as the use of tools within IT environment 200. Use of tools relates to measuring how effective implemented tools are when providing the defined services. Use of tools also may take into account the overhead associated with multiple or non-targeted tools. Tools may or may not be interchangeable within IT environment 200. Tools appropriate for a narrow function or component of IT environment 200 will increase the complexity factor. Upgrades and modifications may have to take into account these narrowly defined tools because any impact on the tools will have to be addressed. On the other hand, tools useful for a variety of components and functions may reduce complexity with IT environment 200. For example, the use of a multiplicity of tools for narrow functions is an indication of high complexity.

Metric 236 may be classified into 5 different categories to determine CE number 238. CE number 238 may receive a value of 1 if comprehensive utilization of enterprise class tools is implemented. The utilization of these tools provides a consolidated management window into managing heterogeneous environments. The enterprise class tools may be used to manage different aspects of IT environment 200. The consolidated management feature allows the tools to be controlled, or managed, in a linear fashion.

CE number 238 may receive a value of 2 if utilization of multiple enterprise class tools is implemented. The utilization allows consolidated management windows to manage homogeneous environments. Homogeneous environments may be those components of IT environment 100 that are similar or stand alone in some fashion. Other environments or components may not be managed in the consolidated management windows. Further, multiple enterprise tools may signify that various groups of tools may be applicable to only specific parts of IT environment 200. Thus, the overall complexity, and, in turn, MCP 208, will be greater because of taking into account the different groups of tools that are not able to managed in a comprehensive manner.

CE number 238 may receive a value of 3 if a mixture of enterprise and departmental class tools is implemented. The mixture of tools provides multiple management windows into individual environments or components within the organization. Enterprise tools may refer to those tools applicable across the organization, or IT environment 200. Departmental tools may be those tools specific to the different departments and not useable across the organization. Thus, more tools will have to be accounted for in determining MCF 208. In addition, multiple management windows are needed to monitor individual components within IT environment 200.

CE number 238 may receive a value of 4 if utilization of multiple departmental class tools is implemented. Multiple departmental class tools manage each individual component, or environment, within the organization. Some reliance is placed upon managing the component or environment manually. Management windows may not be provided. Further, enterprise tools may be absent for IT environment 200.

CE number 238 may receive a value of 5 if utilization of workgroup class tools or lack of proper tools within IT environment 200 is prevalent. Thus, the proper tools are missing that manage the individual components, or environments, within the organization. Heavy reliance is placed upon manually managing the component or environment. This level increases MCF 208 because no tools are available to provide any management of IT environment 200.

Metric 240 may be referred to as the skill alignment within IT environment 200. Skill alignment relates to how capable the current staff is in meeting the technical requirements of their job. Skill alignment also takes into account the amount of time that the staff has to handle the overall workload. The workload may relate to IT environment 200. Trained and experienced staff and personnel will lower the complexity level, or MCF 208, because they will be able to adjust to changes within IT environment 200 as compared to untrained staff. Further, personnel should have adequate time to do their jobs as opposed to short or unmeetable deadlines that increase stress and lower morale. Such a stressed out workforce may not be able to absorb changes or upgrades as readily as one that is not.

In determining whether personnel are capable, an evaluation is performed to determine if the people who do the work self-sufficient and do they meet the minimum requirements for their level of work. Advanced degrees or many of years of experience may not be the only factors in judging the skill alignment. Self-sufficient individuals are able to work alone on tasks without considerable supervision or training and focus on getting the job done in a timely fashion. An environment exhibiting bad skill alignment is one where one or two people do all the work and the organization is overly reliant on these people to fix or repair problems.

Metric 240 may be classified into 5 different categories to determine CE number 242. CE number 242 may receive a value of 1 if IT environment 200 includes advanced level staff that function within their areas of expertise. Further, the staff receives sufficient time and resources to execute their responsibilities. Advanced level staff may be defined as those with a certain degree of experience or education in their areas of expertise. They also may be defined by the number of years within the organization or working within IT environment 200. Sufficient time and resources reduce the potential impact of changes or upgrades to IT environment 200. Personnel can learn and absorb the differences to keep MCF 208 low. By functioning with their areas of expertise, staff are not asked to do tasks for which they have no experience or training, thereby reducing confusion and bad decisions.

CE number 242 may receive a value of 2 if IT environment 200 includes well trained staff that functions within their areas of expertise. Further, the staff may receive somewhat less time and resources than needed to execute their responsibilities. Well trained staff may still be considered educated or experienced, but maybe not as much as advanced level staff. Well trained staff, however, may still be considered competent and knowledgeable about their areas of expertise so that training costs and resources are minimized. Somewhat less time and resources result in staff being stressed or overly tasked to handle their workload, and may result in work being done poorly or not on time. Thus, MCF 208 will increase because of the added complexity of dealing with these problems.

CE number 242 may receive a value of 3 if IT environment 200 includes adequately trained staff that functions mostly in their area of expertise. Further, the staff may receive less than sufficient time and resources to execute their responsibilities. At this level, the staff may not be as educated or experienced as well trained staff, and may need some additional training in order to absorb changes or modifications to IT environment 200. Some staff may be tasked to function outside their area of expertise, which reduces the competency of the personnel because they do not have the proper amount of experience or education to complete tasks. Less time and resources being available also increases the complexity factor, or MCF 208, of IT environment 200 because staff will be tasked to do more with less and under more stressful situations.

CE number 242 may receive a value of 4 if IT environment 200 includes poorly trained staff that does not function within their areas of expertise. Further, the staff may suffer from a lack of sufficient time and resources to execute their responsibilities. Poorly trained staff increases the complexity of IT environment 200 because they may not be able to absorb changes or upgrades very well, and may require additional training and resources to function in a productive manner. If staff is working outside their areas of expertise, they probably are prone to mistakes and problems due to inexperience or unfamiliarity despite their education or experience. Lack of sufficient time and resources will increase MCF 208 for the reasons disclosed above, and because additional time and resources will be spent fixing mistakes as opposed to executing their responsibilities.

CE number 242 may receive a value of 5 if IT environment 200 includes untrained staff that does not function within their areas of expertise. Further, the untrained staff may suffer from having a tremendous lack of sufficient time and resources to execute their responsibilities. This level results in the lowest form of skill alignment. Additional resources will be needed to train staff on how to function in their areas, and even more will be needed to introduce any changes or upgrades within the organization. The issue of having staff outside their areas of expertise results in additional burdens on getting anything done. Competency of the staff is very low. A tremendous lack of time and resources results in a higher complexity factor because jobs may not get done or deadlines may have a high level of unpredictability due to staff not being able to do them.

Thus, metric 240 addresses the issues of staff competency, proper roles within the organization, and sufficient time and resources to get the job done. Services may be delivered in a less complex manner than in situations with poorly trained staff or inadequate time and resources to execute responsibilities.

Metrics 232, 236 and 240 may be associated with tier 204. Tier 204 includes those metrics that are considered fairly important to determining the overall complexity, or MCF 208. Improvements in these areas will result in some reduction of MCF 208, but not as much as the metrics associated with tier 202. Tier 204 also includes weight 212 that determines the overall value of metrics 232, 236 and 240 within MCF 208. For example, weight 212 may be 30%, which is half the percentage of weight 210 of tier 202. Thus, one would probably want to exhaust the potential improvements in the metrics of tier 202 before moving to the metrics of tier 204. Improvements, however, in the metrics of tier 204 are not minimal and can help bring MCF 208 down to an acceptable level for IT environment 200.

Metric 244 may be referred to as the rate of reactive change for IT environment 200. The rate of reactive change relates to how often changes are to be implemented, outside of an existing schedule, to the technology infrastructure, processes or procedures. IT environment 200 may be dynamic as changes and modifications are made that are unplanned or unforeseen. In other words, a schedule for changes and upgrades may exist, but circumstances may require deviations from the schedule or additions to the schedule. Organizations and environments that minimize the changes will have a lower complexity factor than those that experience a greater number of unplanned changes.

Metric 244 may be classified into 5 different categories to determine CE number 246. CE number 246 may receive a value of 1 if 5 or less unplanned changes occur per month. The unplanned changes may address component outages or performance issues. The occurrences per time period may be adjustable according to IT environment 200. For example, instead of measuring the number of outages per month, the present invention may consider the number of outages per year or per week. In any event, fewer unplanned changes results in a reduced MCF 208.

CE number 246 may receive a value of 2 if between 6 and 10 unplanned changes occur per month. Again, the unplanned changes may address component outages or performance issues. CE number 246 may receive a value of 3 if between 11 and 15 changes occur per month. CE number 246 may receive a value of 4 if between 16 and 20 unplanned changes occur per month. CE number 246 may receive a value of 5 if more than 20 unplanned changes occur per month. Thus, the greater number of occurrences per month results in a higher complexity factor as additional resources and staff are committed to implementing the unplanned changes.

Metric 248 maybe referred to as the expected growth of IT environment 200. The expected growth relates to how prepared IT environment 200 is to handle growth. The expected growth also may relate to how much growth is expected in the future. For example, the expected growth may take into account growth for the next 3 years. An increase in complexity, or MCF 208, may result if large scale growth within IT environment is expected.

Metric 248 may be classified into 5 different categories to determine CE number 250. CE number 250 may receive a value of 1 if growth in environmental components is less than 10% over the next time period. As disclosed above, the time period may be defined, such as 3 years. Small growth results in lower complexity as IT environment 200 does not have to adjust to large changes and upgrades, or new components, during this time.

CE number 250 may receive a value of 2 if growth in environmental components is less than 15%. CE number 250 may receive a value of 3 if growth is expected to be less than 20% over the defined time period. CE number 250 may receive a value of 4 if growth is expected to be less than 25%. CE number 250 may receive a value of 5 if growth is expected to be 25% or greater. Thus, a large expected amount of growth results in a larger MCF 208.

Metrics 244 and 248 are associated with tier 206. Tier 206 includes those metrics considered to have the least amount of impact on MCF 208. Like tiers 202 and 204, tier 206 has weight 214 that determines the amount of the values assigned to metrics 244 and 248 goes into MCF 208. For example, weight 214 may be 10%. Thus, the values are assigned to metrics 244 and 248, while 10% of their value goes into MCF 208.

As can be appreciated by one skilled in the art, the percentages of weights 210, 212 and 214 may be adjusted as desired to increase or decrease the impact that the metrics associated with those tiers has on the overall complexity factor. Further, in a different environment analysis, the metrics may be moved to different tiers. In addition, the definitions of the different levels for assigning values within the metrics may be dynamic as well. The number of categories may be increased or decreased as needed.

After MCF 208 is determined, changes or improvements may be made to IT environment 200 to lower the values assigned to the metrics. Thus, real changes may be identified and implemented that impact the delivery of services in IT environment 200. After any improvements have been made, MCF 208 again may be determined using the same criteria to see if an appreciable reduction in the overall complexity has resulted. A potential value for each metric may be identified to provide reachable goals for an organization, and to give guideposts for improving the delivery of services.

Figure 3:
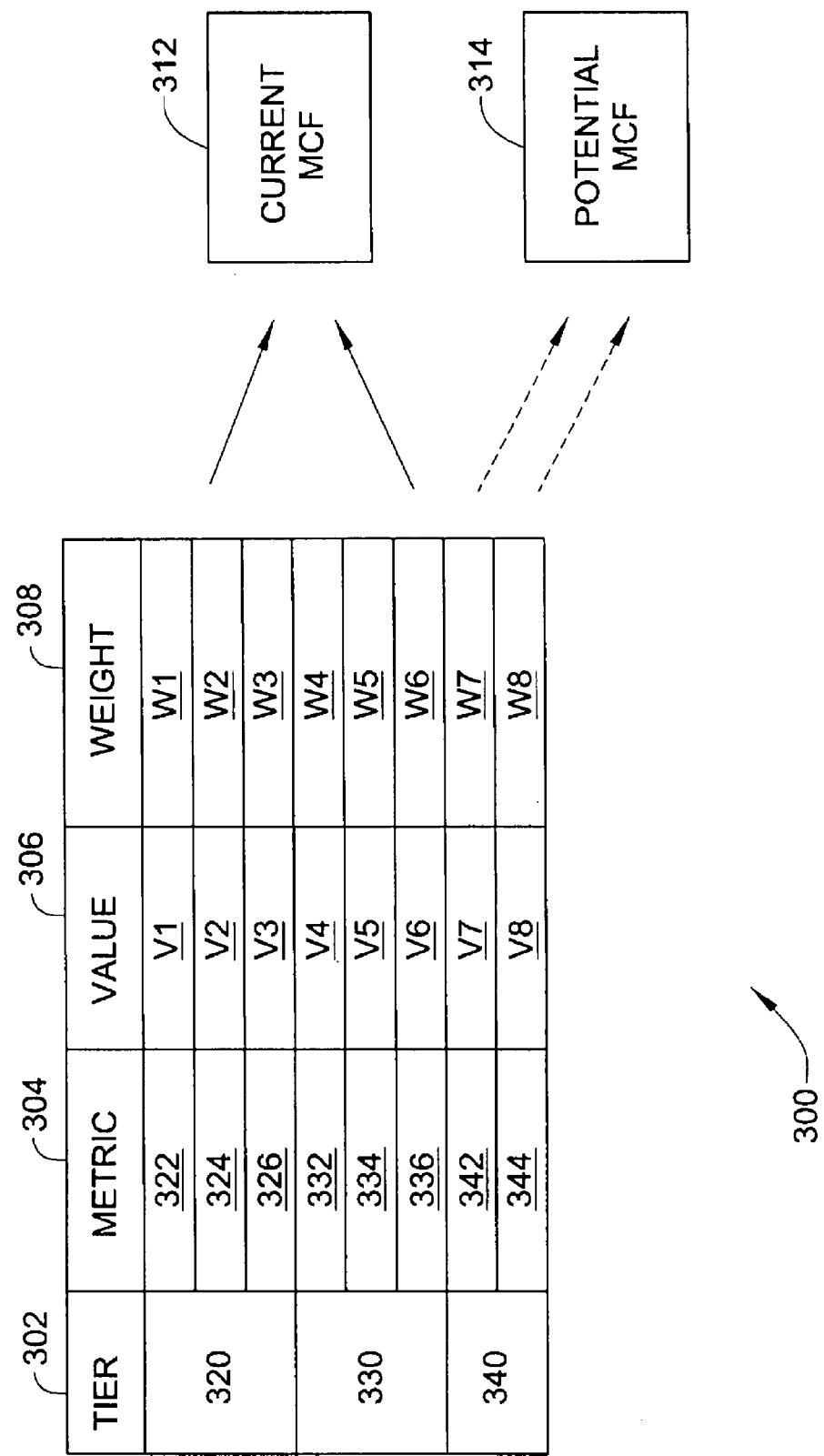
FIG. 3 illustrates a table of metrics, tiers and weights according to the disclosed embodiments.

FIG. 3 depicts a table 300 showing metrics 304 and values 306 to determine MCF 312 according to the disclosed embodiments. Table 300 shows columns and rows for metrics 304, assigned values 306, and corresponding weights 308 that are used to determine current MCF 312. Table 300 is disclosed for illustrative purposes only, and to provide an example on how the metrics, values and weights relate to each other.

Tiers 302 include a column of the different tiers applicable to an environment. Referring back to FIG. 2, three tiers are disclosed that are associated with the metrics. FIG. 3 discloses this relationship by having tier 320 associated with metrics 322, 324 and 326. For example, tier 320 may represent those metrics considered most important in determining the complexity factor for the environment. Thus, the values assigned to metrics of tier 320 will impact current MCF 312 significantly. Tier 330 is assigned to metrics 332, 334 and 336 in the same manner. Tier 330 may include those metrics deemed to be important to the determination of current MCF 312, but not as important as those assigned to tier 320. Tier 340 may represent metrics 342 and 344 that have the least impact on current MCF 312. Metrics assigned to tier 320 may not necessarily be those regarding the most important aspects of the environment, or impacting the most components. These metrics should be those having the most impact on the complexity of the environment, and degrading the delivery of services within the environment.

Metrics 322-344 disclose the metrics being considered in measuring the complexity in the environment. As disclosed above, each metric includes categories that define the level of complexity for the metric based on objective criteria. The values may be placed in the column for values 306. Each value may be referred to as v1-v8 for metrics 322-344, respectively. For example, each of metrics 322-344 may receive a value of 1 to 5. The value may be placed in table 300 as one of values v1-v8.

Table 300 also includes weights 308 having weight values w1-w8, or one weight value for each metric. After the value has been assigned, the weight is gotten for that value. Thus, for each value of values v1-v8, a corresponding weight is determined for weight value 308.

Weight values 308 may be determined according to different processes. For example, weight values 308 may correspond to value 306. The corresponding weight value may be looked up according to a table and then inserted into table 300. Alternately, the assigned value may be multiplied to determine the weighted value. The present invention is not limited to these algorithms to assign value. An increase in the amount of metrics from each tier may not result in a significant increase in he As disclosed with reference to FIG. 2, tiers 320, 330 and 340 include their own weights to emphasize and de-emphasize the metrics accordingly.

For example, the weight value for metric 334 is to be determined. Metric 334 is reviewed and analyzed. A value of 2 is assigned to v5, which represents the second highest level one can get for metric 334. To determine weighted value w5, value v5 is looked up in another table that correlates v5 to w5. Value v5 is not used directly to determine current MCF 312, but is used instead to provide the basis to select w5. The present invention may use weighted values w1-18 to further emphasize or de-emphasize the metric 334. Referring to the example, if v5 for metric 344 is 2, then weighted value w5 may be 20.

Weighted values w1-w8 are selected for table 300. The weighted values for each tier are added together, and multiplied by the weight of the respective tier. For example, metrics 322, 324 and 326 are added together and multiplied by 60% to get a tier value for current MCF 312. In turn, metrics 332, 334 and 336 are added together and multiplied by the weight for tier 204. Metrics 342 and 344 are added together, and multiplied by the weight for tier 206. The three values are added together to determine current MCF 312.

Table 300 may be analyzed to select the largest weighted values from w1-w8. These weighted values may suggest metrics to target for improvement to decrease complexity in the environment. Further, potential values may be assigned for metrics 322-344 to reduce the complexity factor. The potential values also may provide realistic goals and tasks to reduce complexity. While current MCF 312 provides a snapshot of complexity in an existing environment, potential values for metrics can provide a potential MCF that measures the differences, or improvement, by making changes to decrease complexity.

Thus, values 306 may be changed to potential values to provide a potential MCF 314 that is compared to current MCF 312. Not every value v1-v8 has to be changed. For example, only metrics 322, 324 and 326 may be improved upon so that values v1, v2 and v3 are the ones that change. Weighted values w1, w2 and w3 also change due to the different values. The new, or potential, weighted values 308 are combined together and subject to the weight of tier 320. Potential MCF 314 is determined. The measurable difference between current MCF 312 and potential MCF 314 may be analyzed to see if any improvement will occur with the implementation of the changes.

Various changes and modifications to metrics 304, values 306 and weighted values 308 may be tested until a solution, or series of solutions, are presented. A solution is accepted, and an action plan may be put into place to change metrics 304 accordingly.

Figure 4:
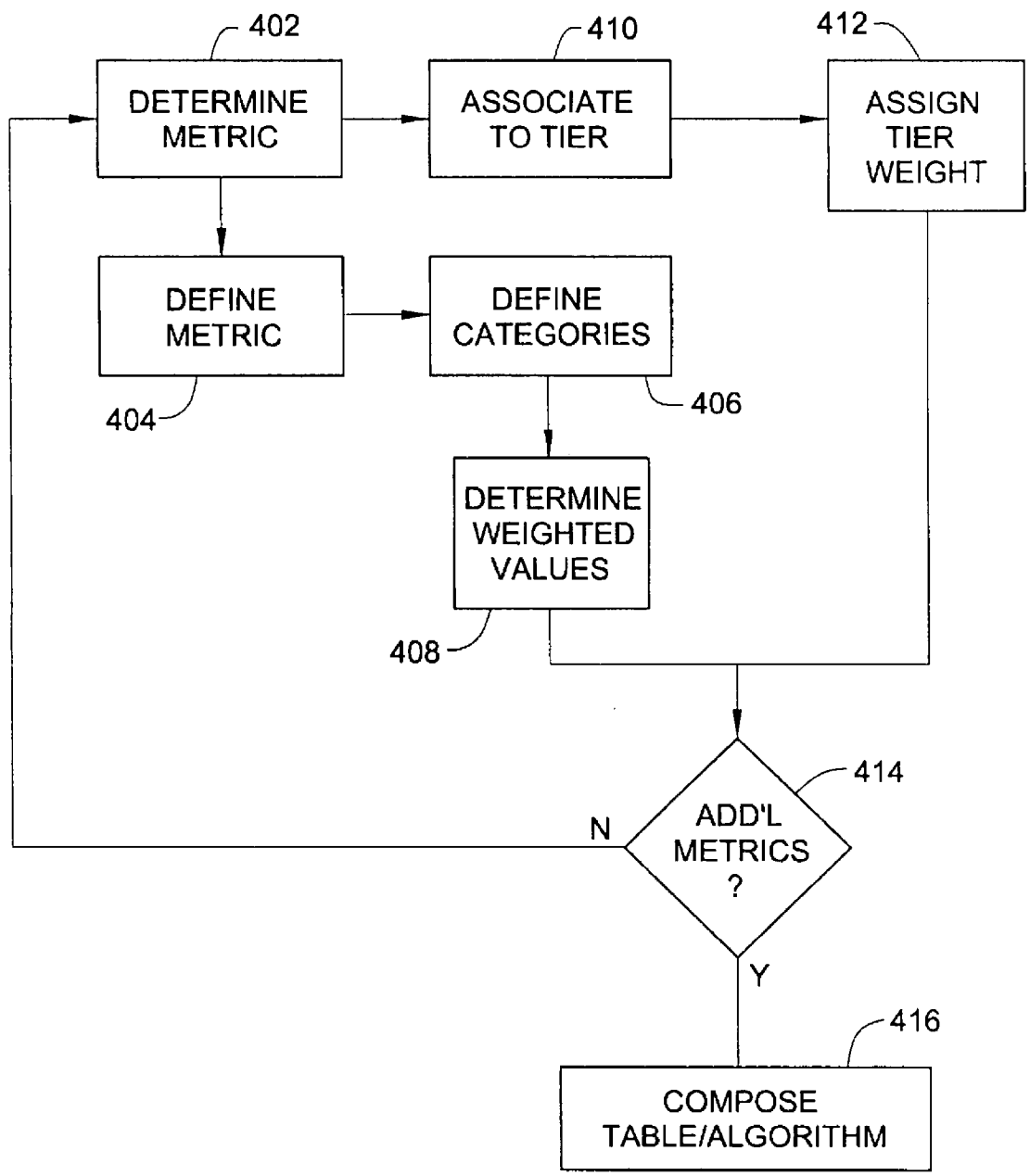
FIG. 4 illustrates a flowchart for creating metrics to determine a management complexity factor according to the disclosed embodiments.

FIG. 4 depicts a flowchart for creating metrics to determine a management complexity factor according to the disclosed embodiments. The flowchart of FIG. 4 discloses steps 402-416. Other steps or actions may be taken with regard to the flowchart, even though the steps are not discussed below.

Step 402 executes by determining a metric to be created. The metric can be one of the metrics disclosed above, or another metric more suited for the environment to be analyzed. Preferably, the metric is related to the delivery of services in the environment and complexity. Step 404 executes by defining the metric. A defined metric provides a starting point for gathering data about the metric from the environment. The definition should explain how the metric interacts with the environment to provide an indication of the complexity. For example, the metric may be referred to as a term, such as information availability, but also includes a sentence or so why information availability is important. As noted above, the definitions and terms disclosed above may be applied for step 404.

Step 406 executes by defining categories for the metric. Preferably, 1 to 5 categories are applicable for each metric. Each category may relate to a specified level of competency within the environment in implementing the metric. Where appropriate, categories should be able to quantify the applicable data or information to distinguish the different levels within the metric. Categories also should be ranked best to worst, with the best category having the lowest category efficiency number being 1. The higher the category efficiency number, the worse the evaluation of the metric.

Step 408 executes by determining the weighted values for the different category efficiency numbers. The values may be numerical values that correlate to the category efficiency number. The values may not necessarily be 1 to 5, and may not be uniformly increased as the category efficiency numbers increase. Thus, one skilled in the art may emphasize particularly needless complexity by making values for high category efficiency numbers large. For example, a metric may have a value of 5 for a category efficiency number of 1, but have a value of 20 for a category efficiency number of 5. This difference may serve to emphasize the attractiveness of lowering the category efficiency number for the metric when making changes or upgrades.

Step 410 executes by associating the metric to a tier. As disclosed above, a tier may include 1 to several metrics grouped together based on importance to the overall complexity of the environment. Tiers may be ranked from most to least important. As metrics are determined, they should be placed in the group best suited for them and to that group's tier. Step 412 executes by assigning a tier weight to the tier. The tier weight provides a mechanism to emphasize or de-emphasize the importance of the metric. The tier weight may be a percentage of the complexity factor that the metrics in the tier are worth to the overall complexity factor. The percentages may not be equal, and are broken between all the tiers.

Step 414 executes by determining whether additional metrics are to be determined and defined according to the present invention. As noted above, several metrics may be created to better determine the complexity of the environment. The number of metrics, however, should not be burdensome to make the analysis too long. Preferably, the number of metrics should be between 6-10 metrics. More preferably, about 8 metrics should be created. If step 414 is yes, then the flowchart returns to step 402 to create another metric. If step 414 is no, then step 416 is executed by composing a table or algorithm having the metrics for the environment, and the objective criteria by which the values are assigned.

Figure 5:
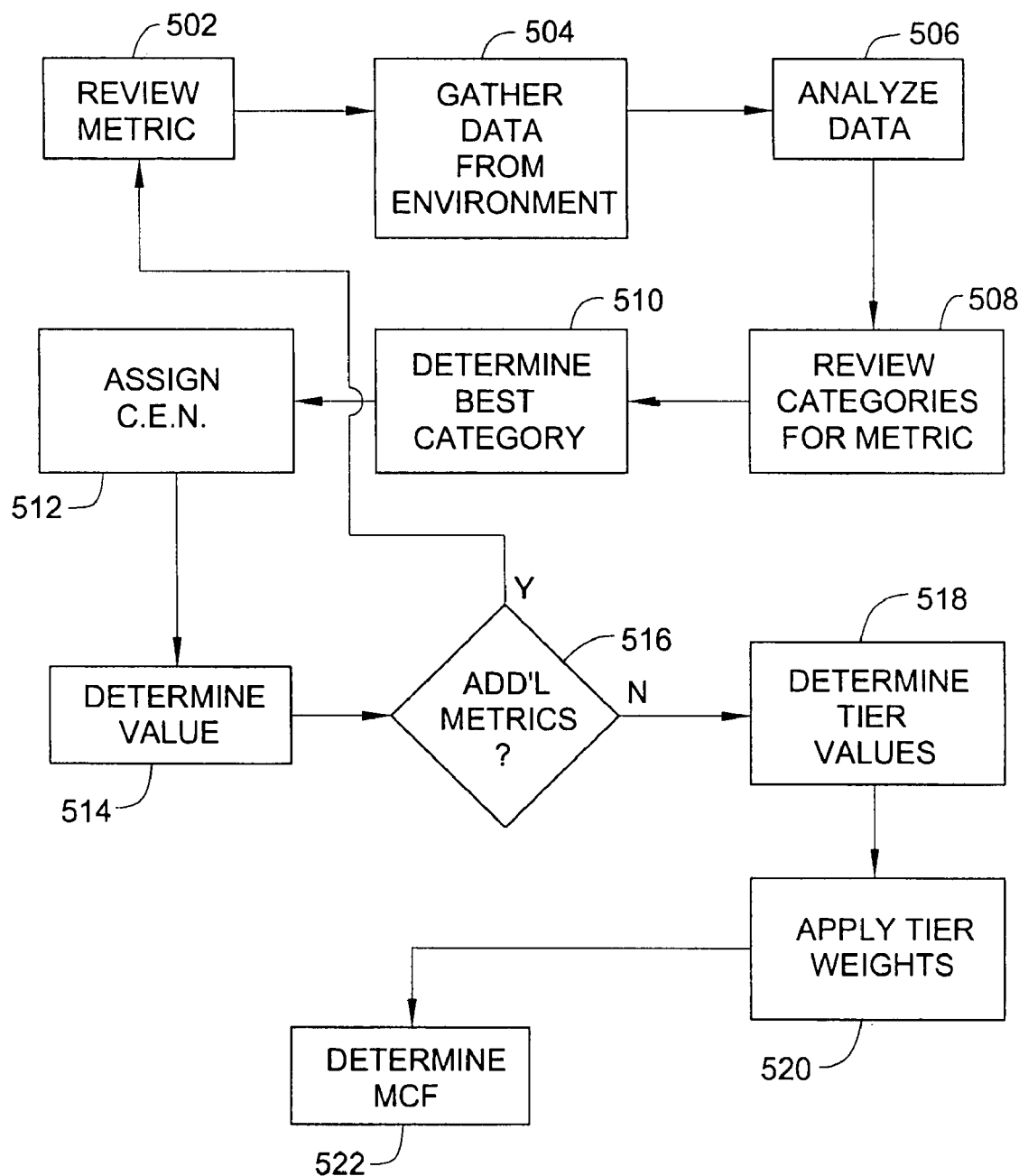
FIG. 5 illustrates a flowchart for determining a management complexity factor according to the disclosed embodiments.

FIG. 5 depicts a flowchart for determining a management complexity factor according to the disclosed embodiments. The flowchart of FIG. 5 may be used in conjunction with the flowchart of FIG. 4. Alternatively, the flowchart of FIG. 5 may stand alone.

Step 502 executes by reviewing the metric to be analyzed. For example, one should review the metric definition and different categories for the metric to know what information to gather. Further, if the definitions or explanations of the metric have changed since the last evaluation, the differences should be apparent. Step 504 executes by gathering data from the environment, components, processes, systems, staff, network and the like regarding the metric. Data and information targeting the subject matter of the metric should be gathered so as to make an informed decision about what the current level is applicable for the metric.

Step 506 executes by analyzing the data. Step 508 executes by reviewing the categories for the metric. Each category may correspond to a category efficiency number, and one skilled in the art would want to be familiar with each category and its definition. Step 510 executes by determining the best category that defines the current level of efficiency related to the metric. The highest level may correspond with the industry's best practices, while the lowest level may correspond to the worst or nonexistent practices.

Step 512 executes by assigning the category efficiency number based on the determined category for the metric. In essence, the category efficiency number is the "score" given for the metric after taking into account the data and the industry's best practices. Preferably, the category efficiency number matches the level of the assigned category, with 1 being the best. Step 514 executes by determining the value for the metric using the weights provided for the metric. The category efficiency number may not be the number used in determining the MCF. The value is that number. The value may be weighted to emphasize or de-emphasize the importance of the metric on the overall complexity factor.

Step 516 executes by determining whether additional metrics are to be evaluated and scored. If yes, then the flowchart returns to step 502 to begin the disclosed process for the next metric. If step 516 is no, then step 518 executes by determining the tier values for the metrics. Tier values may be defined as the values of the metrics combined within a tier. For example, if three metrics are within a tier, then the tier value would be the combination of the determined values.

Step 520 executes by applying the tier weights to the tier values. Tier weights also emphasize or de-emphasize certain metrics within the environment. Tier weights may include percentages that correspond to the amount of the MCF that will come from the tier value. Step 522 executes by determining the MCF by calculating the sum of the tier values as modified by the tier weights. Thus, the MCF is based upon objective criteria as applied to the defined metrics and the gathered data and information. Further, the MCF may be determined over and over as the category efficiency numbers change for the metrics.

By using the present invention, an organization can make significant improvements to their IT environments and current networks by implementing actions aimed at reducing their complexity factor. As disclosed above, a potential complexity factor is calculated that is compared to the current complexity factor. One sees how far off their environment is by determining the difference between the current and potential complexity factor. Further, one can review the different metrics and categories to determine those actions that can be taken to reduce the current complexity factor. Constraints and roadblocks are realized that indicate an area or component of the environment can never be optimized to the lowest level of complexity, and these problems may be addressed. In addition, easy or low cost improvements are indicated that can provide immediate improvement.

Improvements that are realized by reducing the complexity factor includes a reduction in manpower and the ability to manage greater storage. For example, for every 1% of complexity factor that is reduced, the amount of storage can be increased that is manageable given the current manpower. The number of terabytes (TB), for example, is increased by 150% if the environment is made less complex using the present invention. Using the example, an environment using 6-7 TB can increase its capacity to 12 TB by reducing the complexity factor by 1%. Further, the environment can free up the difference by reducing the complexity factor.

Using manpower as an example, a reduction in the complexity factor leads to less people needed to manage the environment. Using the above percentages, the number of people managing the environment is reduced from 10 to 6. Using the same number of people, the environment can grow to meet future needs. In other words, a larger environment is managed with the same number of people. Thus, use of the present invention within current information technology environments provides tangible and definable benefits.

It will be apparent to those skilled in the art that various modifications and variations may be made in the disclosed embodiments of the present invention without departing from the spirit or scope of the invention. Thus, it is intended that the present invention covers the modifications and variations of the disclosure of the specification provided that they come within the scope of the claims and their equivalents.

What is claimed is:

1. A computer implemented method for determining a complexity factor for an environment, the method comprising:
   a processor determining a value of a metric of a plurality of metrics, wherein the metric corresponds to a component of the environment;
   the processor assigning the metric and a corresponding component to one of a plurality of tiers, wherein each tier of the plurality of tiers corresponds to a tier value for a tier weight, and wherein the tier value for the tier weight describes a relative importance of each of the plurality of tiers for overall delivery of services by the environment;
   the processor determining a management complexity factor for the environment using values of the plurality of metrics and tier values for tier weights for the plurality of tiers, wherein the management complexity factor indicates an overall complexity of the environment,
   the processor calculating a potential management complexity factor for a new environment derived from the environment using potential values of the plurality of metrics and the tier values for the tier weights for the plurality of tiers, wherein the potential values are optimized values according to industry best practices;
   the processor comparing the management complexity factor for the environment with the potential complexity factor for the new environment; and
   the processor generating a deliverable document with the management complexity factor.

2. The computer implemented method of claim 1, wherein the plurality of metrics comprises architectural complexity, process maturity, level of automation, information availability, use of tools, skill alignment, rate of reactive changes, and expected growth for the environment.

3. The computer implemented method of claim 1, wherein said assigning includes:
   assigning a first tier weight value for first tier weight to a first tier of the plurality of tiers; and
   assigning second tier weight value for a second tier weight to a second tier of the plurality of tiers, wherein first tier weight value for the first tier weight is greater than the second tier weight value for second tier weight to indicate that components in the first tier have a greater impact on an efficiency of overall delivery of services than components of the second tier.

4. The computer implemented method of claim 1, wherein said assigning includes:
   assigning a first tier weight to a first tier of the plurality of tiers;
   assigning a second tier weight to a second tier of the plurality of tiers; and
   assigning a third tier weight to a third tier of the plurality of tiers.

5. The computer implemented method of claim 1, wherein the value of the metric is derived by determining how closely the component comports with industry best practices for the component.

6. The computer implemented method of claim 1, further comprising modifying the component corresponding to the metric to reduce the management complexity factor.

7. The computer implemented method of claim 1, wherein the tier values for the tier weights provide a mechanism to emphasize an importance of a specific metric for a component within a specific tier, wherein the importance relates to an effect the specific metric has on the overall complexity of the environment.

8. The computer implemented method of claim 1, wherein the plurality of tiers comprises three tiers.

9. A computer program product for determining a complexity factor for an environment, the computer program product comprising:
   a non-transitory computer readable storage media;
   first program instructions for determining a value of a metric of a plurality of metrics, wherein the metric corresponds to a component of the environment;
   second program instructions for assigning the metric and a corresponding component to one of a plurality of tiers, wherein each tier of the plurality of tiers corresponds to a tier value for a tier weight, and wherein the tier value for the tier weight describes a relative importance of each of the plurality of tiers for overall delivery of services by the environment;
   third program instructions for determining a management complexity factor for the environment using values of the plurality of metrics and tier values for tier weights for the plurality of tiers, wherein the management complexity factor indicates an overall complexity of the environment,
   fourth program instructions for calculating a potential management complexity factor for a new environment derived from the environment using potential values of the plurality of metrics and the tier values for the tier weights for the plurality of tiers, wherein the potential values are optimized values according to industry best practices;
   fifth program instructions for comparing the management complexity factor for the environment with the potential complexity factor for the new environment; and
   sixth program instructions for generating a deliverable document with the management complexity factor; and wherein
   the first, second, third, fourth, fifth, and sixth program instructions are stored on the non-transitory computer readable storage media.

10. A computer system comprising:
    a processor, a computer readable memory, and a computer readable storage media;
    first program instructions for determining a value of a metric of a plurality of metrics, wherein the metric corresponds to a component of the environment;
    second program instructions for assigning the metric and a corresponding component to one of a plurality of tiers, wherein each tier of the plurality of tiers corresponds to a tier value for a tier weight, and wherein the tier value for the tier weight describes a relative importance of each of the plurality of tiers for overall delivery of services by the environment;
    third program instructions for determining a management complexity factor for the environment using values of the plurality of metrics and tier values for tier weights for the plurality of tiers, wherein the management complexity factor indicates an overall complexity of the environment, fourth program instructions for calculating a potential management complexity factor for a new environment derived from the environment using potential values of the plurality of metrics and the tier values for the tier weights for the plurality of tiers, wherein the potential values are optimized values according to industry best practices;

fifth program instructions for comparing the management complexity factor for the environment with the potential complexity factor for the new environment; and sixth program instructions for generating a deliverable document with the management complexity factor; and wherein the first, second, third, fourth, fifth, and sixth program instructions are stored on the computer readable storage media.

* * * * *